July 7, 1931.  G. F. WIKLE  1,813,264
TIRE BUILDING MACHINE
Filed Sept. 21, 1927
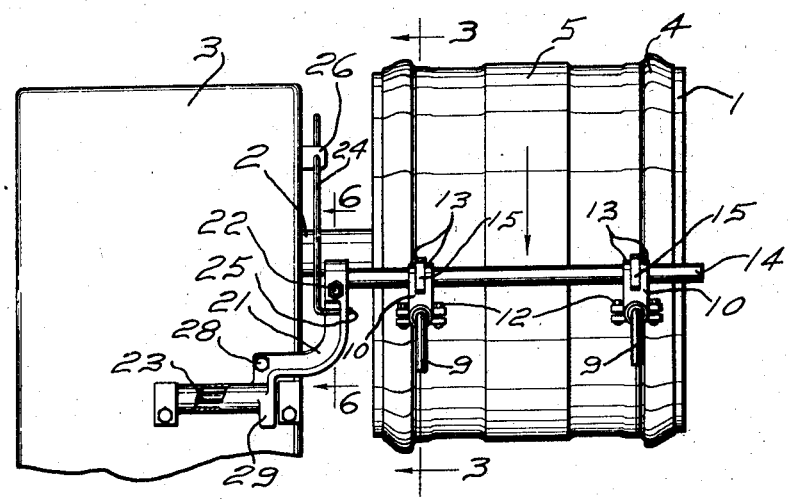
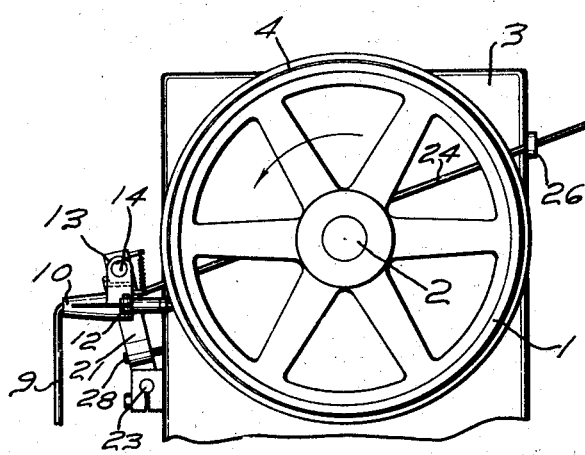
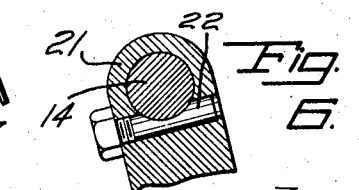
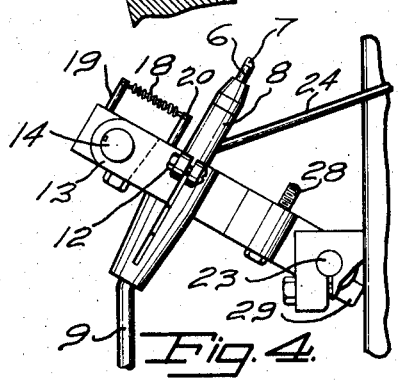
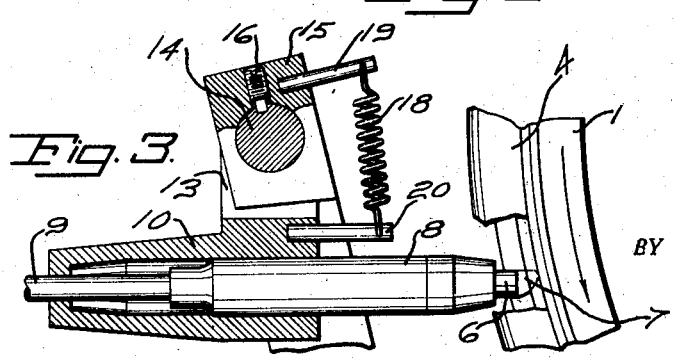
INVENTOR.
GEORGE F. WIKLE.
BY
Robert T. Harvey
ATTORNEY.

Patented July 7, 1931

1,813,264

UNITED STATES PATENT OFFICE

GEORGE F. WIKLE, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

TIRE BUILDING MACHINE

Application filed September 21, 1927. Serial No. 220,921.

My invention relates to tire building machines of the type in which the tire carcass is built upon a substantially flat drum or pulley. More particularly it relates to a device for simultaneously trimming both edges of the tread adjacent the beads of the carcass.

It has for its object the provision of a device which will perform this trimming operation in a more expeditious and accurate manner than is possible by the devices heretofore used for the purpose.

In the accompanying drawings which illustrate one embodiment of my invention,

Fig. 1 is a front elevation showing the cutting device in operative position with respect to the building drum;

Fig. 2 is a side elevation of the structure shown in Fig. 1;

Fig. 3 is a side view, partly in section and on a larger scale, showing the trimming knives in operation;

Fig. 4 is a side view showing the knives in inoperative position;

Fig. 5 is a plan view of one of the knife points; and

Fig. 6 is a section on line 6—6 of Fig. 1.

Referring to the drawings; 1 designates the building drum which is secured to a shaft 2 adapted to be driven in the direction of the arrows in Figs. 1 and 2 by a motor, not shown, enclosed in housing 3. The tire carcass which has been built upon the drum is shown at 4, the tread portion thereof being indicated at 5. The knives 6 are formed with flat, sharp, semi-rounded cutting blades 7, and are surrounded by electrical heating elements 8 connected to any suitable source of current by cables 9. The heated knife units are clamped in angularly adjusted position in split sleeves 10 by bolts 12, the sleeves being formed with spaced bearing projections 13 by means of which the sleeves are rotatably mounted on a supporting shaft 14. Retaining blocks 15 are splined to shaft 14 between bearings 13 and are provided with set screws 16 to permit adjustment of the knife assemblies longitudinally of the shaft. The knives are yieldingly pressed in cutting relation against the tire carcass by springs 18 connecting pins 19 and 20 carried respectively by blocks 15 and sleeves 10.

Shaft 14 may be mounted in any suitable manner for movement toward and from the building drum, and, as shown, is adjustably secured to a bracket 21 by locking pin 22. The angular adjustment of shaft 14 in the bracket 21 controls the initial position of the knives, with respect to the tire carcass, as they are moved into cutting position and also the maximum pressure exerted by springs 18 during the cutting operation when stop 28 is in contact with the housing. Bracket 21 is pivoted to housing 3 as at 23 and the bracket is rocked around its pivot to move the knives against the carcass by means of a rod 24 pivoted to the bracket at 25 and slidably supported adjacent its free end by an eye 26 secured to the housing. The free end of rod 24 is bent to form a handle 27. Forward movement of bracket 21 is limited by an adjustable stop 28 positioned to engage the housing 3 and the rearward movement is limited by a lug 29 also engaging the housing. As will be obvious from Fig. 2, the weight of the supporting shaft 14 and the parts carried thereby normally hold the device out of operative position.

Having thus described my invention, I claim:

A device of the character described comprising, a support extending transversely of the surface of the drum of a tire building machine, mounted for pivotal movement toward and from the drum about an axis parallel to the axis of the drum and normally held out of operative position by its own weight and that of the parts carried by it, a knife carrier suspended from the support, a knife adjustably secured in the carrier, means to swing the support toward the drum to bring the knife into contact with the tire on the drum and a spring connection between the carrier and the support to provide a yielding pressure controlled by the support moving means.

GEORGE F. WIKLE.